United States Patent
Töyrylä

(10) Patent No.: US 7,003,292 B2
(45) Date of Patent: Feb. 21, 2006

(54) MECHANISM FOR POINT-TO-MULTIPOINT COMMUNICATION

(75) Inventor: Hannu Töyrylä, Helsinki (FI)

(73) Assignee: Nokia Corporation, Espoo (FI)

(*) Notice: Subject to any disclaimer, the term of this patent is extended or adjusted under 35 U.S.C. 154(b) by 421 days.

(21) Appl. No.: 09/972,899

(22) Filed: Oct. 10, 2001

(65) Prior Publication Data

US 2003/0069023 A1    Apr. 10, 2003

(51) Int. Cl.
*H04Q 7/20* (2006.01)
*H04Q 7/28* (2006.01)
*H04H 1/00* (2006.01)
*H04J 3/24* (2006.01)
*H04L 12/43* (2006.01)

(52) U.S. Cl. .............. 455/426.1; 455/452; 370/312; 370/341; 370/461

(58) Field of Classification Search ............ 455/452.1, 455/426.1, 426.2, 432.1, 432.2, 432.3, 440, 455/404.2, 456.1, 452; 370/312, 462, 328, 370/329, 341, 461
See application file for complete search history.

(56) References Cited

U.S. PATENT DOCUMENTS

| | | | |
|---|---|---|---|
| 5,761,193 A | | 6/1998 | Derango et al. |
| 6,028,866 A | * | 2/2000 | Engel et al. ................ 370/461 |
| 6,112,083 A | * | 8/2000 | Sweet et al. ............. 455/426.1 |
| 6,477,150 B1 | * | 11/2002 | Maggenti et al. ........... 370/312 |
| 6,545,995 B1 | * | 4/2003 | Kinnunen et al. .......... 370/341 |
| 6,591,111 B1 | * | 7/2003 | Stosz et al. .............. 455/426.1 |
| 6,710,702 B1 | * | 3/2004 | Averbuch et al. ......... 455/426.1 |
| 2003/0069023 A1 | * | 4/2003 | Toyryla ...................... 455/452 |
| 2004/0190468 A1 | * | 9/2004 | Saijonmaa ................... 370/312 |

FOREIGN PATENT DOCUMENTS

| | | |
|---|---|---|
| DE | 100 64 107 | 6/2002 |
| WO | WO 94/28687 | 12/1994 |
| WO | WO 01/17292 | 3/2001 |
| WO | WO 01/47301 | 6/2001 |
| WO | WO 01/67787 | 9/2001 |

OTHER PUBLICATIONS

Agha et al., "Dynamic Slot Allocation for multicasting in GPRS system," 2000 IEEE 51st Vehicular Technology Conference, Tokyo, May 15-18, 2000, vol. 3, Conf. 51, May 15, 2000, pp. 2355-2359.

U.S. Appl. No. 09/835,867, filed Apr. 17, 2001, Lopponen et al.

* cited by examiner

*Primary Examiner*—William D. Cumming
(74) *Attorney, Agent, or Firm*—Pillsbury Winthrop Shaw Pittman LLP

(57) ABSTRACT

Point-to-multipoint communication on a communications network includes receiving a first downlink packet stream addressed to a first mobile recipient, checking whether the first stream is associated with group communication, which has already reserved downlink radio resources for a second downlink packet stream of a second mobile recipient located in the same radio cell as the first mobile recipient. If there are no existing radio resources, new radio resources are allocated for the first stream. If there are existing radio resources, no new radio resources are allocated but the first mobile recipient is instructed to receive the second stream over existing radio resources.

16 Claims, 2 Drawing Sheets

MECHANISM FOR POINT-TO-MULTIPOINT COMMUNICATION

FIELD OF THE INVENTION

The present invention relates to communications systems, and more particularly to mechanisms for point-to-multipoint communication in a mobile radio network.

BACKGROUND OF THE INVENTION

Point-to-multipoint or group communications can be defined as communications from a single source towards at least two recipients. In packet switched group communications, transmission and switching functions are achieved by packet-oriented techniques, so as to dynamically share network transmission and switching resources between a multiplicity of connections. In packet switched data transmission e.g. a voice message may be broken down into fixed-length addressed packets, which are then transmitted to their destination independently.

Group communications can be multicast communications, unicast communications or anycast communications. Anycast can be defined as transmission of a single protocol data unit (PDU) where the PDU reaches the nearest single destination, whereas multicast can be defined as transmission of a single protocol data unit where the PDU reaches a group of one or more destinations. Group communications using multicast results in economical use of resources, but the implementation requires complicated management of group multicast addresses, group membership and location of group members. The principal problem in this approach is that it is not possible to keep group information separate from the mobile network—the various elements in the mobile network need to be aware of group information.

IP (Internet Protocol) multicasting can also be defined as sending IP packets to a host group. Each group has its own IP address. Joining a group or departing the group is dynamic, i.e. a subscriber can join or depart the group any time, and there are practically no limitations on the size of the group. One host can belong to many groups, and a host sending packets to the group does not have to belong to that group. The host can connect to a group by IGMP (Internet Group Management Protocol) protocol.

Multicast communication works on top of TCP/IP (Transmission Control Protocol/Internet Protocol) based networks, where multicast routers guide the multicast transmission of IP packets. However, in multicasting data is not transmitted via routers to subnets where there are no subscribers to a service.

A third alternative described in a co-pending U.S. patent application Ser. No. 09/835,867, is to use individual, unicast sending to each group member separately by a group bridge provided in an IP network overlaying a radio network employed as an access network. The radio network controls the mobility and radio resources. However, this approach becomes problematic when multiple group members are located in the same cell. In case group members are closely concentrated in a location, this can prevent the voice from reaching some of the members due to congestion in the radio network. The group voice is usually listened to at loudspeaker volumes. Unicast has then also the problem that if two or more recipients happen to be very close to each other, the delay difference in the received voice heard by the recipients may severely limit the intelligibility of reception.

BRIEF DISCLOSURE OF THE INVENTION

An object of the present invention is thus to provide a method and an apparatus for implementing the method so as to overcome the above-mentioned problems. The objects of the invention are achieved by a method and an arrangement, which are characterized by what is stated in the independent claims. The preferred embodiments of the invention are disclosed in the dependent claims.

In group communication according to the invention, the same information is sent to each receiving party in the group by means of an individual downlink packet stream addressed to the respective recipient. These multiple downlink packet streams are forwarded to a radio access network or networks serving the recipients. The radio access network, or more particularly a network element controlling the radio resources, will check before allocating a new radio resource for a downlink packet stream whether the specific stream contains a group identifier or some other indication associating the stream with group communication. If the downlink stream is associated with group communication and a downlink radio resource is already reserved for that group communication in the same cell, the same radio resource can be used and no new radio resource is needed. Otherwise a new resource is reserved.

An advantage of the method and arrangement of the invention is the efficient use of radio resources combined with easy implementation, because multicast addressing is not used and the radio access network does not need to maintain information on group membership and location.

BRIEF DESCRIPTION OF THE DRAWINGS

In the following, the invention will be described in greater detail by means of preferred embodiments with reference to the accompanying drawing, in which.

DETAILED DESCRIPTION OF THE INVENTION

Although the preferred embodiments of the invention will be described in connection with the GSM (Global System for Mobile communications) and GPRS (General Packet Radio System) systems, the basic principles of the invention can be employed in any communications system and for any data—voice, data, short message, video etc.—, which do not reserve a communication channel permanently. The invention can be applied e.g. on a communications network comprising a group bridge, an IP network, and a radio network.

The present invention is especially well applicable to a new group communication concept and system described in the co-pending U.S. patent application Ser. No. 09/835,867, which is incorporated herein by reference. The present invention can be used for allocating downlink radio resources in the mobile communications system and radio access network, which has the overlaying packet-mode group communication service.

Figure 1:
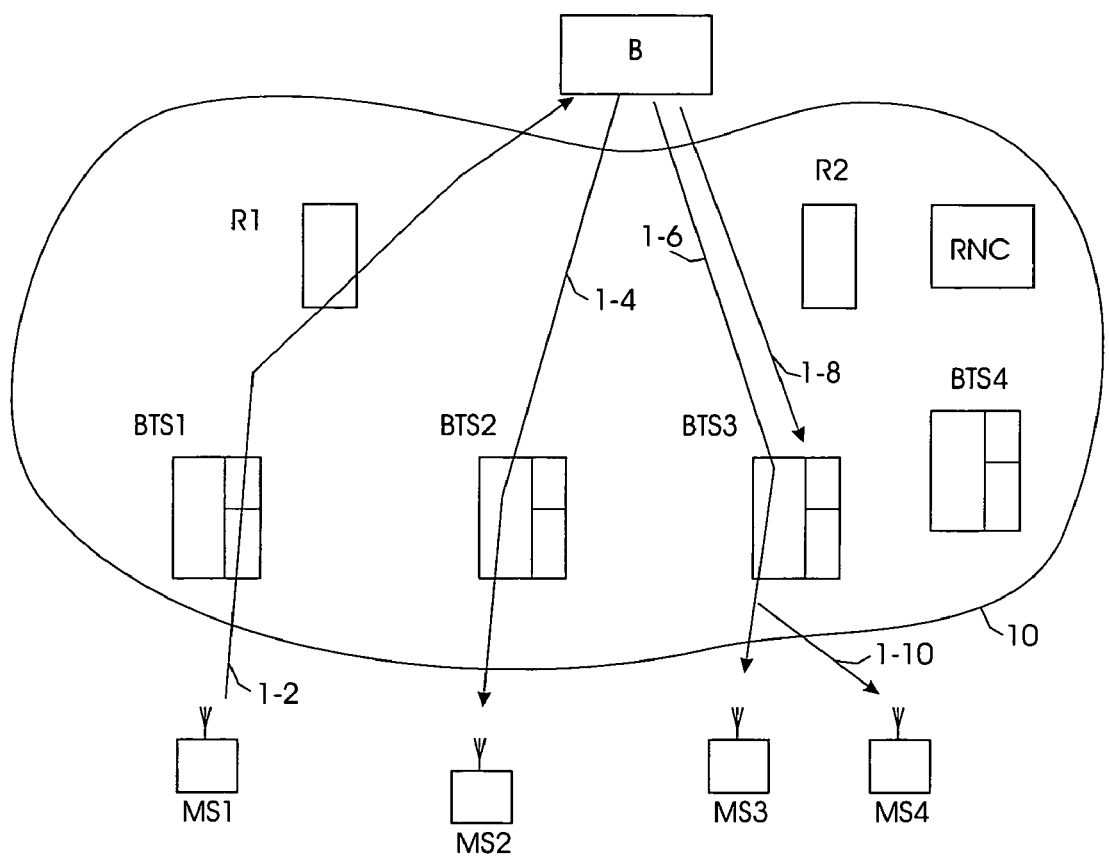
FIG. 1 illustrates the general system chart of a communications system with the principles of the present invention.

FIG. 1 shows a general system chart of the communications system to which the invention can be applied. Four subscribers MS1 (Mobile Station 1), MS2, MS3 and MS4 are connected to the communications system, in this case to a digital mobile system. The mobile stations MS1 to MS4 can be e.g. conventional mobile stations or 3$^{rd}$ generation (like UMTS, Universal Mobile Telecommunications system) mobile stations equipped with a group communication application.

In FIG. 1, B denotes a group bridge. The bridge can be defined as a function or network entity, which manages the group communication between users, located in the underlying radio access network. All the group communication is routed via the group bridge B. The bridge is capable of holding group membership information and multiplying group-addressed voice into individual voice streams for group members. The bridge may be, but it does not have to be, a part of the mobile network.

BTS1 to BTS4 are base stations (SGSN, a serving GPRS support node, in the GPRS network for possibly serving many cells at different base stations; RAN, a Radio Access Network in a third generation network) capable of identifying that a resource is already allocated for a downlink voice stream. Thus, instead of allocating a new resource for the new data stream, the base station may direct the recipient of the new stream to use the resource already allocated. Elements R1 and R2 are optional connections, which act as gateways between the GPRS network and the packet switched public data network (PSPDN). In the GPRS network, these elements are GGSN (gateway GPRS support node) elements.

The radio network part 10 manages the location of subscribers, i.e. their roaming, and enables correct traffic routing when the subscriber moves from one network to another or from one cell to another.

In FIG. 1 the voice stream 1-2 is sent from the originator of a message, i.e. from the mobile station MS1, to the group bridge B. The upstream voice stream 1-2 is thus addressed to the group bridge B but it can also carry a group identifier. The voice stream may be a stream of IP packets, in which case it is provided with an IP address of the group bridge B. In a further embodiment of the invention, the upstream voice stream 1-2 may be routed to the group bridge B via a user proxy of the sending mobile station. Such a user proxy may provide various user-related services relating to the packet mode voice communication. However, it should be noted that it is not relevant to the invention in which way or from which source the uplink voice stream is provided to the group bridge.

The bridge multiplies the upstream voice stream 1-2 into multiple downlink voice streams 1-4, 1-6 and 1-8, i.e. one downlink voice stream for each (active) receiving group member MS2, MS3 and MS4 in the group, respectively. In other words, each uplink packet received is copied into multiple downlink voice streams. Each downlink voice stream 1-4, 1-6 and 1-8 is provided with the address of the individual recipient it is intended to, but it can also be marked with a unique group identifier or stream identifier. This extra identifier, which can be a field in the protocol header (IP/UDP/RTP, Internet Protocol/User Datagram Protocol/Real-time Transport Protocol), may be the same as that used in step 1-2.

Each of the multiple downlink streams 1-4, 1-6 and 1-8 is individually forwarded from the group bridge B to the radio access network 10. In a further embodiment of the invention, each downlink stream can be routed to the radio access network 10 via a user proxy (not shown) of the respective receiving mobile station. Such a user proxy can provide various user-related services relating to the packet mode voice communication. However, it should be noted that it is only relevant to the invention that multiple downlink streams relating to the same group communication are somehow sent to the radio access network 10.

Figure 2:
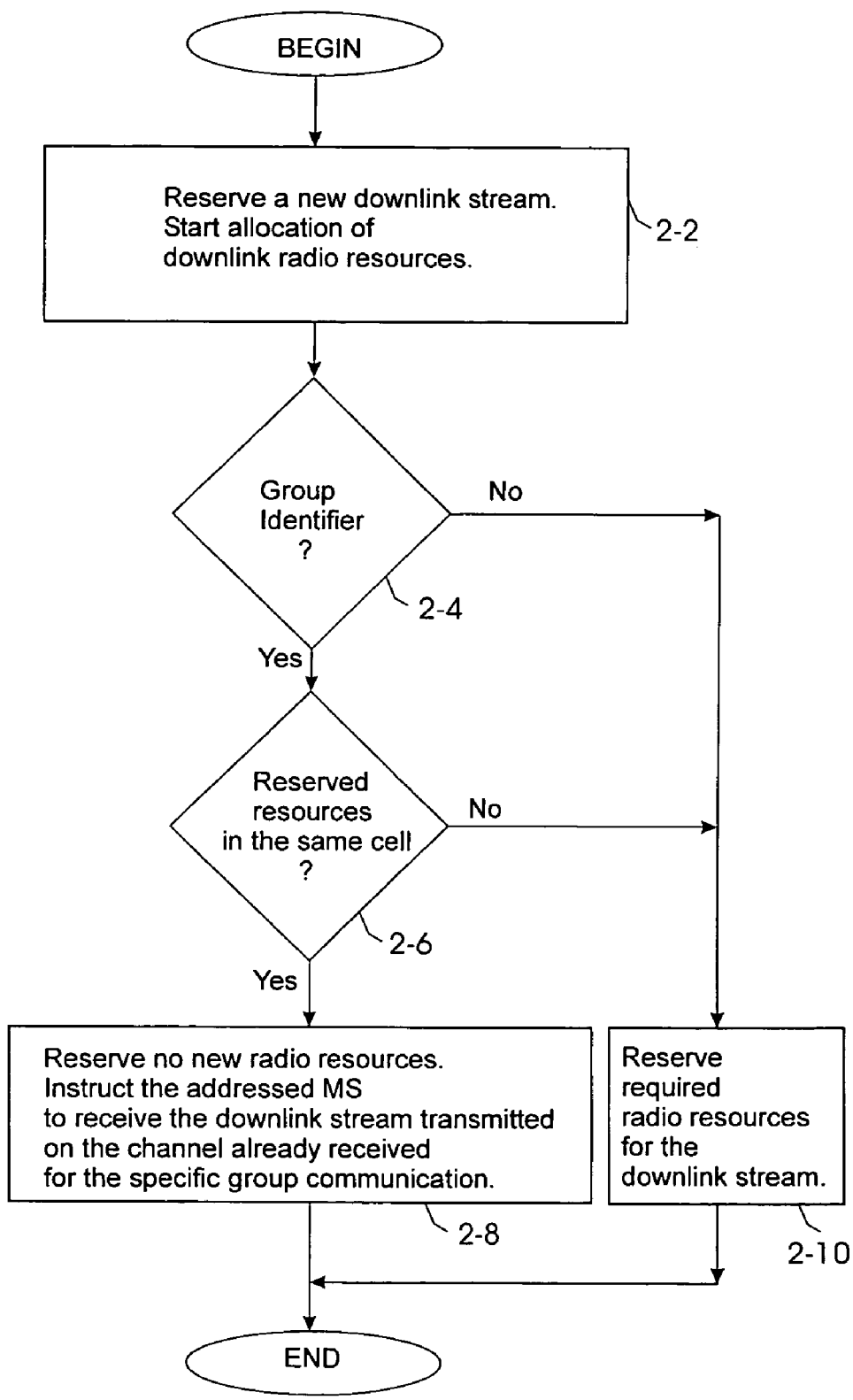
FIG. 2 is a flow chart illustrating the allocation of radio resources according to an embodiment of the invention.

The radio access network (RAN) 10 reserves the radio interface resources for transferring the multiple downlink voice streams to the receiving mobile stations MS2, MS3 and MS4. Normally, the RAN would reserve a radio interface resource separately for each downlink stream and recipient in the cell in which the recipient is located. In the present invention, the radio access network 10 or its resource controller (such as the RNC) will check before allocating a new radio resource for a downlink voice stream whether the specific stream contains a group identifier or some other indication which associates the stream with group communication. If the downlink stream contains a group identifier and if a resource is already reserved with the same group identifier in the same cell, the same resource may be used. Otherwise a new resource may be reserved. The flow chart of FIG. 2 illustrates an example of radio resource allocation according to the invention. This allocation can be carried out by any network element, which is responsible for the radio resources.

In the example shown in FIG. 1, the mobile station MS2 is the sole member of the group in the cell served by the base station BTS 2. Therefore, a radio resource is reserved for the downlink voice stream 1-4 addressed to the MS2 only. In this case the allocation procedure follows the steps 2-2, 2-4, 2-6 and 2-10 in FIG. 2. This corresponds to the conventional radio resource allocation in the radio access network. Further in the example shown in FIG. 1, the radio access network receives two downlink streams 1-6 and 1-8 associated with same group communication e.g. having the same group identifier but addressed to different destinations (i.e. mobile stations MS3 and MS4) located within the same cell served by the base station BTS3.

Let us assume that the downlink stream 1-6 to the MS3 is received first by the radio access network 10 or its resource controller (step 2-2 in FIG. 2). The resource controller detects that the downlink stream 1-6 contains a group identifier (yes-branch in step 2-4) and that there are no downlink resources already reserved for the same group communication (i.e. with the same group identifier) in the same cell (no-branch in step 2-6). Therefore, the resource controller allocates the radio resources to the MS3 in a similar way as for any individual mobile station (step 2-10). Then the resource controller begins to handle the downlink voice stream 1-8 to the MS4. Now, the resource controller detects that the downlink stream 1-8 contains a group identifier (yes-branch in step 2-4) and that there are downlink resources already reserved for the same group communication (i.e. with the same group identifier) in the same cell, or that such resources are being reserved (yes-branch in step 2-6). Thus, no new resource is reserved, and the MS4 is instructed to receive the same stream as the MS3. Finally, both mobile stations MS3 and MS4 listen to the same radio channel and receive the same voice stream 1-10 (step 2-8 in FIG. 2).

Since multiple recipients use the same downlink resource, they will also receive exactly the same stream. Thus, even if the radio access network receives multiple streams, only one of them is forwarded over the radio channel, and the remaining one(s) are discarded. However it is to be noted that each stream comes from the same source and contains identical information.

When multiple radios receive an identical stream according to this invention, the destination IP address can match only one of the recipients. Thus, the RAN can replace the destination IP address with an address, which is acceptable for all recipients. To achieve this, the group identifier or a part of it can be used as a multicast address to the downstream radio path.

In one embodiment of the invention it is possible to include a method for the radio access network to send a packet backwards to the group bridge B to suppress the unnecessary streams, i.e. the downlink packet stream 1-8 in the above example.

In a handover situation, when the mobile station moves into a new cell, the resources are allocated to the mobile station in a similar manner as described above. In other words, if there are no radio resources already reserved for the specific group communication in the new cell, new radio resources are allocated to the mobile station. However, if there are downlink radio resources already reserved for the specific group communication, the mobile station is instructed to receive a downlink packet stream by means of these existing resources.

As described above, the invention is a mechanism for implementing point-to-multipoint communication in a mobile radio network, in which multicast addressing is not used and the radio access network does not need to maintain information on group membership and location. The method is mainly intended for implementing voice group communications in a packet-based mobile network, although it can be used for any multipoint communications and for any data.

The invention and its embodiments avoid complicated management of group multicast addresses, group membership and location of group members, because now it will be possible to keep group information separate from the mobile network, and the various elements in the mobile network need not be aware of group information. Also, no problems arise when multiple group members are located in the same cell. If group members are closely concentrated in a location, the sent voice stream reaches the group members also in situations like congestion in the radio network.

Since the group voice is usually listened to at loudspeaker volumes, the delay difference in the received voice heard by the recipients may severely limit the intelligibility of reception, if two or more recipients happen to be very close to each other. The invention also avoids this problem.

In other words, the special advantages of the invention and its embodiments are efficient use of radio resources combined with easy implementation. The radio network and group communications applications can thus be developed separately in independent layers, which is not the case in state of the art.

It will be obvious to a person skilled in the art that as the technology advances the inventive concept can be implemented in various ways. The invention and its embodiments are not limited to the examples described above but may vary within the scope of the claims.

What is claimed is:

1. A method for point-to-multipoint communication on a communications network, comprising
reserving, at a radio access network downlink, radio resources for a first downlink packet stream of a first mobile recipient, the packet stream being associated with group communication,
receiving a second downlink packet stream addressed to a second mobile recipient located in the same radio cell as said first downlink packet stream mobile recipient,
checking whether the second downlink packet stream is associated with group communication, and,
if the second downlink packet stream is associated with group communication, checking whether the second downlink packet stream is associated with the same group communication as the first downlink packet stream, and
if the second downlink packet stream is not associated with the same group communication as the first downlink packet stream, allocating new radio resources for said first downlink stream, and
if the second downlink packet stream is associated with the same group communication, allocating no new radio resources for the second downlink packet stream and instructing said second mobile recipient to receive said second downlink packet stream over said first downlink.

2. A method as claimed in claim 1, wherein said first and second downlink packet streams are received from a group server controlling said group communication.

3. A method as claimed in claim 1 or 2, wherein the radio access network requests an originator of said first and second downlink packet streams to suppress said second downlink packet stream, if the second mobile recipient is instructed to receive said first downlink packet stream over the radio resources already reserved for another mobile recipient located in the same cell.

4. A method as claimed in claim 1 or 2, wherein said packets contain speech information.

5. A method as claimed in claim 1 or 2, wherein said packets are Internet Protocol packets.

6. A method as claimed in claim 1 or 2, wherein said packets contain speech information according to Voice over IP recommendations.

7. A method for point-to-multipoint communication on a communications network, comprising
reserving, at a radio access network downlink, radio resources for a first downlink packet stream of a first mobile recipient,
receiving, at a group server controlling group communication a single uplink packet stream from a sending party of said group communication, said uplink packet stream being addressed to said group server and containing information that associates it with said group communication,
multiplying said uplink packet stream into at least two downlink packet streams, each of which being individually addressed to one recipient of said group communication,
sending said downlink packet streams to the radio access network or networks serving the recipients of the group communication,
receiving, at the radio access network, a second downlink packet stream addressed to a second mobile recipient,
checking whether the second downlink packet stream is associated with group communication, and,
if the second downlink packet stream is associated with group communication, checking whether the second downlink packet stream is associated with group communication that has already reserved downlink radio resources for the first downlink packet stream of the first mobile recipient located in the same radio cell as said second mobile recipient, and
if the second downlink packet stream is not associated with group communication that has already reserved downlink radio resources for the first downlink packet stream of the first mobile recipient located in the same radio cell as said second mobile recipient, allocating new radio resources for said second downlink stream, and if the second downlink packet stream is associated with group communication that has already reserved downlink radio resources for the first mobile recipient located in the same radio cell as said second mobile recipient, allocating no new radio resources for the second downlink packet stream and instructing said second mobile recipient to receive said first downlink packet stream over said already reserved radio resources.

8. A method as claimed in claim 7, wherein the radio access network requests an originator of said first and second downlink packet streams to suppress said second downlink packet stream, if the second mobile recipient is instructed to receive said first downlink packet stream over the radio resources already reserved for another mobile recipient located in the same cell.

9. A method as claimed in claim 7, wherein said packets contain speech information.

10. A method as claimed in any one of claims 7 to 9, wherein said packets are Internet Protocol packets.

11. A method as claimed in any one of claims 7 to 9, wherein said packets contain speech information according to Voice over IP recommendations.

12. A mobile communications system comprising
means for reserving at a radio access network downlink radio resources for a first downlink packet stream of a first mobile recipient, means for receiving a second downlink packet stream addressed to a second mobile recipient,
means for checking whether the second downlink packet stream is associated with group communication and for checking, in response to the second downlink packet stream being associated with group communication, whether the second downlink packet stream is associated with group communication that has already reserved downlink radio resources for a first downlink packet stream of a first mobile recipient located in the same radio cell as said second mobile recipient, and
means for allocating new radio resources for said second downlink stream in response to the second downlink packet stream not being associated with group communication that has already reserved downlink radio resources for the first downlink packet stream of the first mobile recipient located in the same radio cell as said second mobile recipient, and
means for instructing said second mobile recipient to receive said first downlink packet stream over said already reserved radio resources in response to the second downlink packet stream associated with group communication that has already reserved downlink radio resources for the first mobile recipient located in the same radio cell as said second mobile recipient.

13. A system as claimed in claim 12, comprising means for sending to an originator of said first and second downlink packet streams a message commanding the originator to suppress said first downlink packet stream, if the first mobile recipient is instructed to receive the radio resources already reserved for another mobile recipient located in the same cell.

14. A system as claimed in claim 12 or 13, wherein said packets are Internet Protocol packets.

15. A system as claimed in claim 14, wherein said packets contain speech information according to Voice over IP recommendations.

16. A network element controlling radio resources in a radio access network receiving downlink packet streams addressed to mobile recipients located within said radio access network, wherein
said network element comprises means for reserving at the radio access network downlink radio resources for a first downlink packet stream of a first mobile recipient,
said network element being configured to respond to receiving, at the radio access network, a second downlink packet stream addressed to a second mobile recipient by checking whether the second downlink packet stream is associated with group communication and to check, in response to the second downlink packet stream being associated with group communication, whether the second downlink packet stream is associated with group communication that has already reserved downlink radio resources for a first downlink packet stream of a first mobile recipient located in the same radio cell as said second mobile recipient,
said network element being configured to allocate new radio resources for said second downlink stream in response to the second downlink packet stream not being associated with group communication that has already reserved downlink radio resources for the first downlink packet stream of the first mobile recipient located in the same radio cell as said second mobile recipient, and
said network element being configured to allocate no new radio resources for the second downlink packet stream and to instruct said second mobile recipient to receive said first downlink packet stream over said already reserved radio resources in response to the second downlink packet stream being associated with group communication which has already reserved downlink radio resources for the first mobile recipient located in the same radio cell as said second mobile recipient.

* * * * *